United States Patent [19]

Johnson

[11] 4,352,350

[45] Oct. 5, 1982

[54] MEANS FOR TRACKING THE SUN

[76] Inventor: Carl W. Johnson, Rte. 3-Box 93, North Judson, Ind. 46366

[21] Appl. No.: 95,349

[22] Filed: Nov. 19, 1979

[51] Int. Cl.³ .............................................. F24V 3/02
[52] U.S. Cl. .................................. 126/425; 126/438; 126/440; 353/3
[58] Field of Search ............... 126/424, 425, 438, 440; 353/3

[56] References Cited

U.S. PATENT DOCUMENTS

| 2,712,772 | 7/1955 | Trombe | 126/425 |
| 4,022,185 | 5/1977 | von Hartitzch | 126/425 |
| 4,027,651 | 6/1977 | Robbins, Jr. | 126/425 |
| 4,063,543 | 12/1977 | Hedger | 126/425 |
| 4,089,323 | 5/1978 | Trihey | 126/425 |
| 4,129,119 | 12/1978 | Yoke | 126/438 |
| 4,158,356 | 6/1979 | Wininger | 126/425 |
| 4,159,710 | 7/1979 | Prast | 126/425 |
| 4,198,954 | 4/1980 | Meijer | 126/425 |

Primary Examiner—Samuel Scott
Assistant Examiner—Lee E. Barrett
Attorney, Agent, or Firm—Charles S. Penfold

[57] ABSTRACT

The subject invention involves equipment for tracking the sun by utilizing its energy. Otherwise expressed, the invention is directed to what may be termed a solar collector assembly which is operated by the rays of the sun for automatically maintaining the assembly correctly positioned on the sun in order to substantially obtain the maximum amount of energy therefrom when it is available.

16 Claims, 12 Drawing Figures

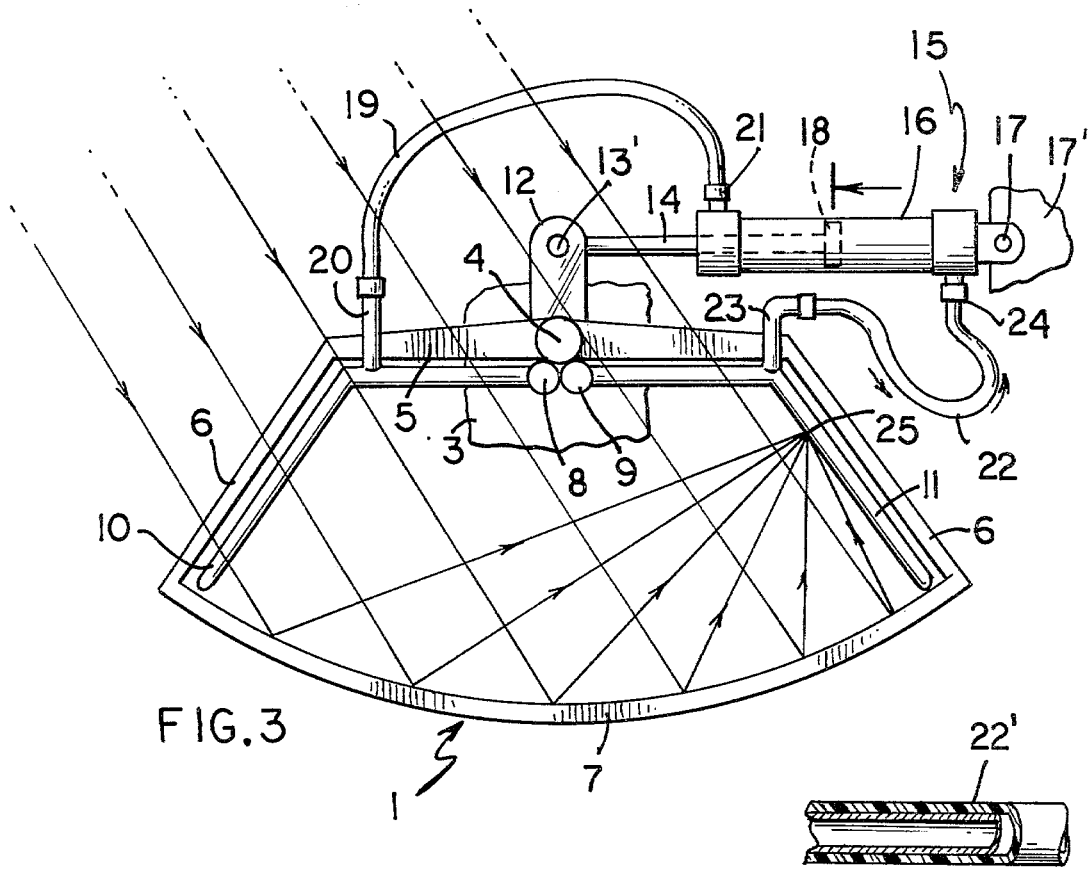
FIG.3
FIG.3a
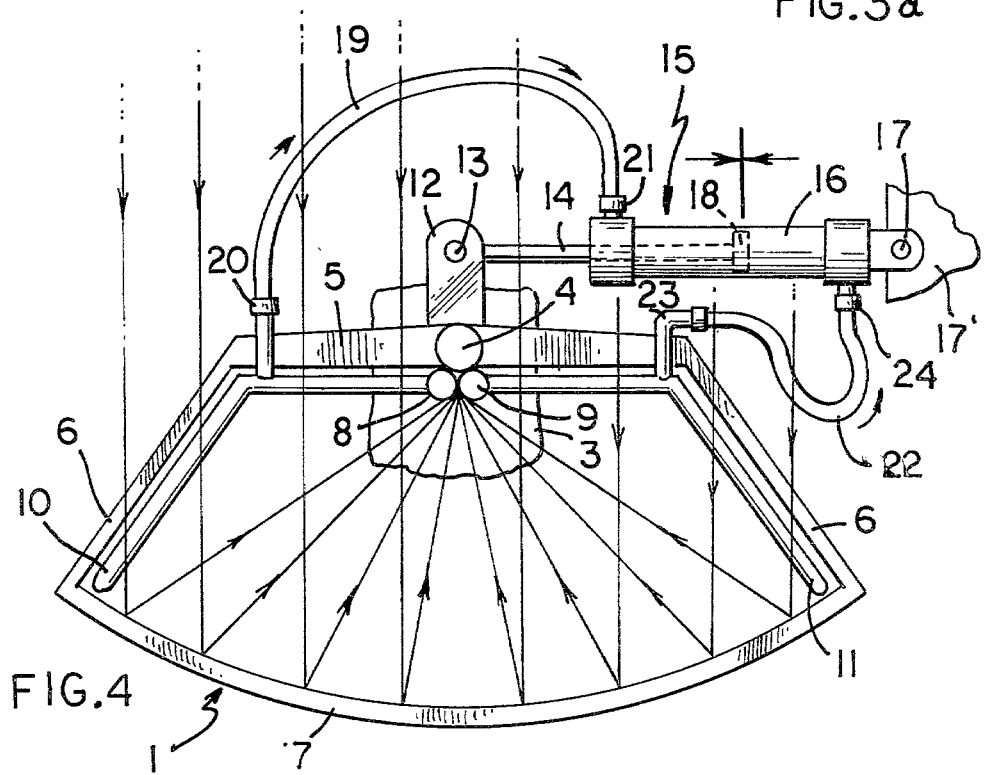
FIG.4

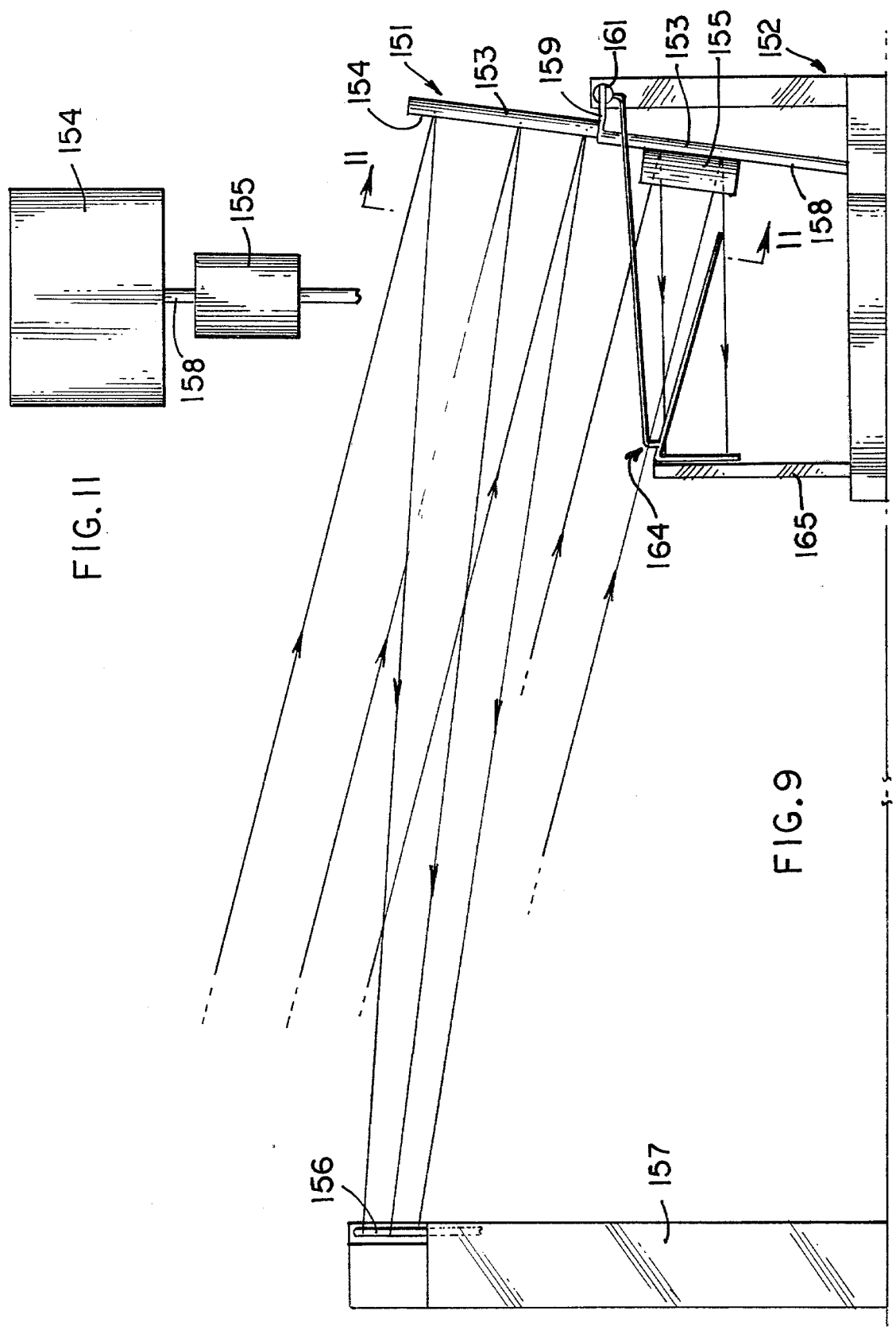

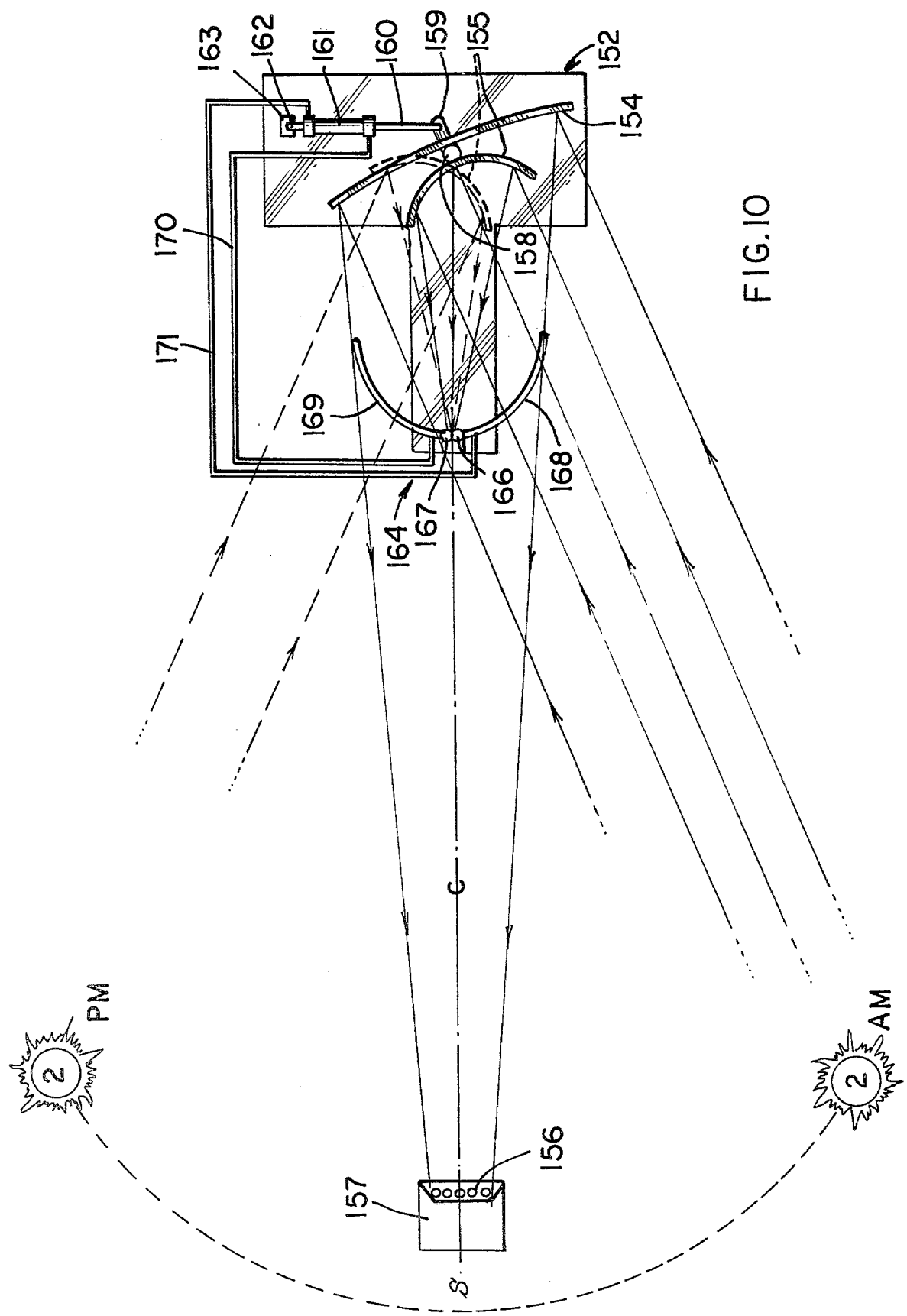

MEANS FOR TRACKING THE SUN

SUMMARY OF THE INVENTION

It is recognized that prior attempts have been made to track the position of the sun by utilizing instruments generally referred to as heliostats. For example, a computer has heretofore been employed to calculate the position of the sun in the sky and electronically command motorized gear trains to correctly or properly aim a heliostat. Computerization of such equipment is highly expensive, complex and includes a multitude of intricate electrical and mechanical components or elements which are difficult to assemble and are subject to a high likelihood of malfunction and consequently require manual corrective procedures.

Also, it is recognized that a number of prior art Patents have issued relating to equipment for utilizing the sun's rays, including the following: Felix Trombe, U.S. Pat. No. 2,712,772, Donald Anderson U.S. Pat. No. 3,924,604 and John H. Hedger U.S. Pat. No. 4,063,543.

OBJECTIVES

In view of the foregoing, one of the important objectives of the subject invention is to provide equipment, a system or systems for tracking the sun which, among other things, comprises a pair of individual heat responsive means which contain a volatile fluid which when heated creates pressures in the heat responsive means, image means for focusing the sun's rays against said heat responsive means for heating the latter, and a control which is operatively connected to and responsive to the heat responsive means whereby to correctly position the image means toward the sun or otherwise track the latter to obtain the full benefit therefrom.

More particularly, the invention or inventions as disclosed in the subject application may be considered to comprise a supporting structure, an assembly which is connected to this structure for movement with respect thereto and includes: a pair of heat responsive means, means which is responsive to the rays of the sun for heating the heat responsive means for producing pressures therein, a pair of connecting means which are respectively communicatively connected to the heat responsive means and extend therefrom for connection with a control which is responsive to the pressures whereby to automatically control the position of the assembly with respect to the supporting structure so that the ray or image responsive means will be correctly directed toward the sun.

A specific objective is to present various structures which operate or function differently from the disclosures in the above identified Patents, including all other prior art presently known to the inventor of this subject invention or inventions.

A significant object of the invention is to provide a supporting structure for the assembly which is stable and durable and adapted to be located to normally position the assembly in a generally south position and in which the assembly is preferably pivotally connected to the supporting structure for operation by the control above referred to.

More specifically, but importantly, the equipment embodying the invention or inventions has a high level of reliability and efficiency under a wide range of operating conditions, is substantially self correcting, and able to reestablish, reposition or focus the ray responsive means against the heat responsive means after any intermittent shining of the sun. In other words, the assembly can relocate the sun's position if once lost, particularly at the beginning of a day.

Additional objectives reside in providing equipment which is relatively simple in design and construction and comprised of a comparatively minimum number of inexpensive parts or components which can be readily assembled and adjusted and an organization, system or systems which are basically independent of ambient temperatures and changes in humidity, substantially resistant to damage by any excessive wind pressures and capable of locating, for example, the morning sun without exercising any special manual procedures. The equipment also has a tendency to very strongly lock the image means in the correct responsive position and automatically return it to a southward position or orientation (in the northern hemisphere) at any time the image means cannot respond to the sun's rays. Upon rediscovery of the sun, the image means will correct itself towards the sun's position and locks onto it.

A specific objective is to provide a fluid control system or systems which serve to firmly hold the assembly in any one of an infinite, number of movable pivotal positions with respect to its supporting structure and yet allow for a minimum of cushioning during relative movement. Otherwise expressed, the system or systems due to its design and construction offers a setup which is shock resistant.

Additional attributes or advantages of the invention or inventions will become apparent after the description hereinafter set forth is considered in conjunction with the drawings annexed hereto.

DRAWINGS

In the drawings:

FIG. 3 is a top view of a more detailed disclosure of FIG. 1;

FIG. 3A is a partial section taken on a portion of a conduit showing that the same is insulated;

FIG. 4 is a top view of a more detailed disclosure of FIG. 2;

FIG. 9 is a schematic side elevational view showing a fourth modification of the invention;

FIG. 10 generally depicts a top view of the modification of FIG. 9; and

FIG. 11 is a transverse view taken substantially on line 11—11 of FIG. 10.

DESCRIPTION

Figure 1:
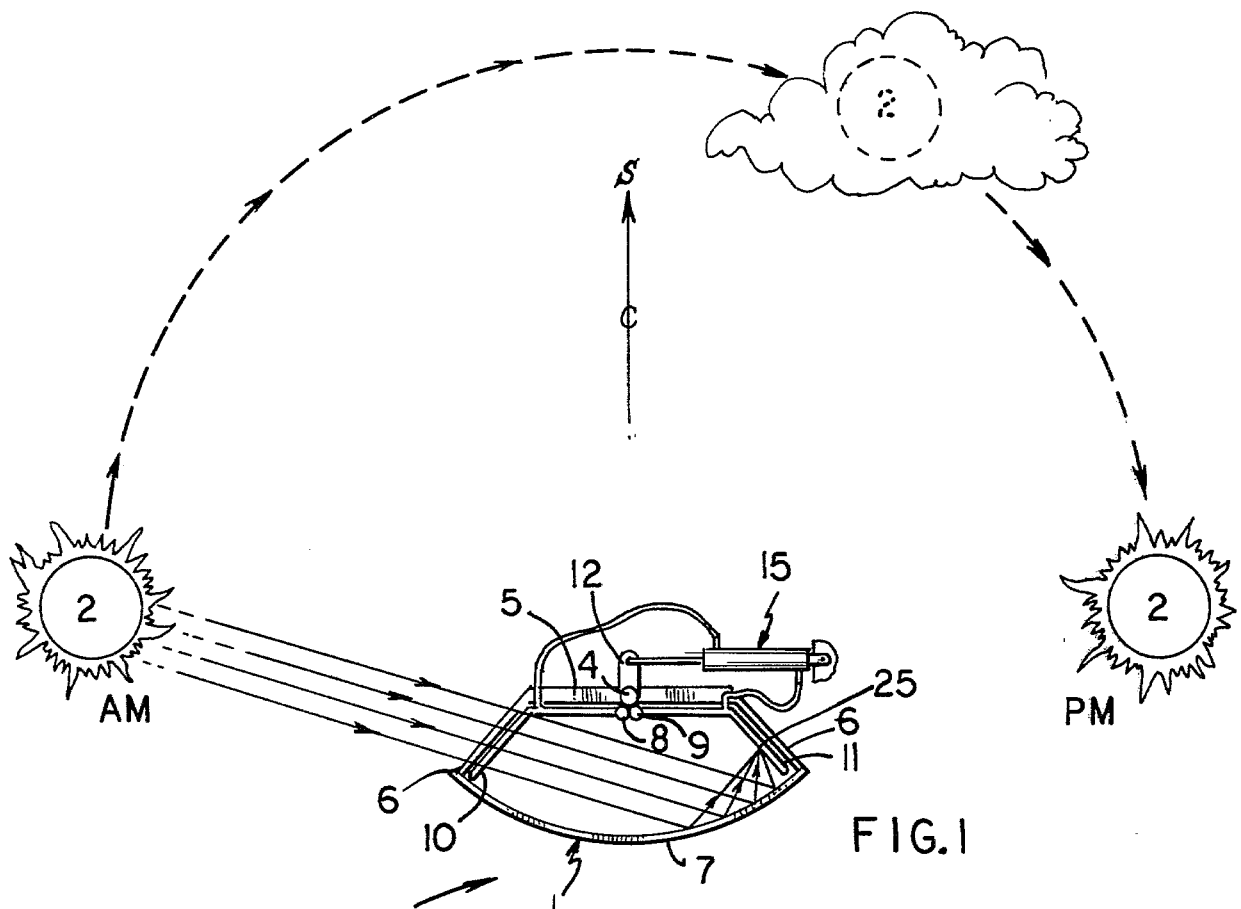
FIG. 1 is a schematic view illustrating an assembly normally disposed in a south direction in relation to the morning and afternoon positions of the sun.
Figure 2:
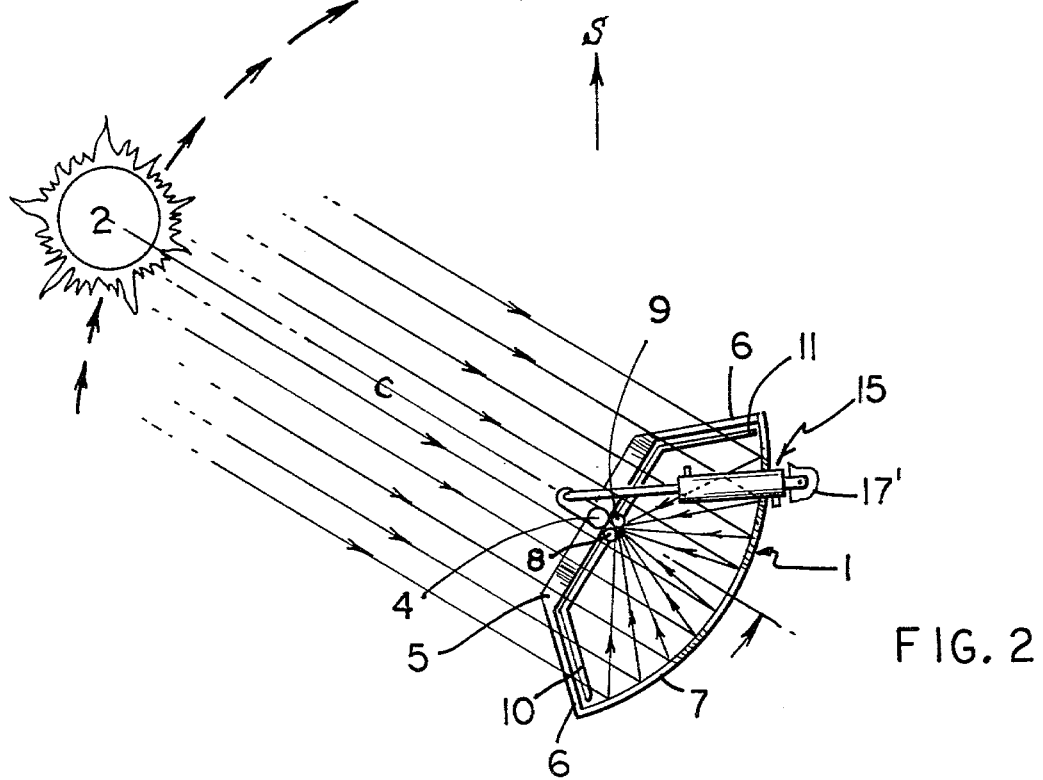
FIG. 2 is a scematic view similar to FIG. 1 depicting the assembly in one of its infinite tracking positions.

Referring to FIGS. 1 and 2, an assembly generally designated 1 is shown as being mounted to face a south line position S in relation to an A.M. or morning position of the sun 2 and to a P.M. or afternoon position of the sun. This assembly is mounted on a substantial supporting structure 3, portions of which are shown in FIGS. 3 and 4, for pivotal movement about an axis 4. The pivotal connection is of a sufficient length to promote stability in the relative movement.

More particularly, the assembly is best illustrated in FIGS. 3 and 4, and preferably comprises a support or mounting having a base or wall 5 and at least a pair of divergent arms or members 6. An image means 7 or ray responsive means is connected to outer ends of the arms 6 in a bridging relation thereto. This image means is preferably in the form of an elongated parabolic cylinder and constructed to serve as a reflector for directing or focusing the sun's rays against a pair of closely associated heat responsive means or boilers 8 and 9 which are preferably centrally attached to an inner side of the base 5 substantially directly opposite and in close proximity to the axis 4. The boiler 8 also preferably includes an angled or branch element 10 which generally conforms to the shape of the base 5 and frame 6 and the boiler 9 correspondingly includes a branch or angled element 11. The boilers are adapted to contain any volatile fluid, such as for example, Freon or ammonia which will vaporize readily and produce the desired pressures when heated.

The support or base 5 of the assembly is preferably provided with a fixed centrally disposed lever or arm 12 and this lever is pivotally connected at 13 to an outer end of a piston rod 14 of a control generally designated 15. This control is preferably designed and constructed as shown and comprises a cylinder 16 which has one end pivotally connected at 17 to a stationary support 17' of which only a portion is depicted in FIGS. 3 and 4. A piston 18 is connected to the rod 14 and disposed in the cylinder for reciprocation as shown by the arrows. An elongated connecting means 19 preferably in the form of an insulated flexible conduit is communicatively connected to the heat responsive means 8 via the branch element 10 and to a fore extremity of the cylinder of the control by fluid tight couplings 20 and 21 and a similar connecting means or conduit 22 is connected to the other heat responsive means 9 via the element 11 and to an opposite or rear extremity of the cylinder by couplings or fittings 23 and 24. The connecting means 19 and 22 are of a character to withstand excessive pressures and of sufficient lengths and flexibility so as to enable the assembly 1 to be moved relative to its supporting structure 3 and the control 15 without interference.

In view of the foregoing, each of the heat responsive means or boilers and its branch element and conduit connection may be considered to constitute a separate fluid operable system connected to the control 15, the latter of which is common to both systems and it is the differential or variable pressures in these systems which apply forces to control, move, or pivot the assembly 1 with respect to its supporting structure 3. It is to be understood that any control suitable for the purpose can be utilized in lieu of the control shown.

The boilers 8 and 9 can be designed and constructed in various ways but are preferably made of copper tubing or any material suitable for the purpose and preferably have internal cross-dimensions in the neighborhood of one-half inch ($\frac{1}{2}''$) and their lengths in the neighborhood of eight feet (8') for some installations. The internal cross-dimensions of the branch elements 10 and 11 are somewhat less than that of the boilers 8 and 9. The image means can be designed and constructed in various ways as hereinafter described but as shown it is preferably of a size generally four feet (4') by eight feet (8') and disposed in the neighborhood of two feet (2') to three feet (3') away from the boilers 8 and 9. It is to be understood that the aforementioned dimensions of the named components can be modified to accommodate the objectives desired because any particular installation may not be suitable to accomplish a different objective and this factor should become evident when the modifications or embodiments of the invention or inventions hereinafter described are taken into consideration.

Referring to FIGS. 1 and 3, the assembly 1 is depicted as being installed or placed in a south position S and not specifically aimed or directed toward the morning sun 2 but as the sun rises the image means 7 will cause incoming rays of sunlight as indicated by arrows to be focused or reflected at a point 25 and infinite additional points against the branch element 11 of the heat responsive means or boiler 9 as the sun rises. This increased intensity of heat causes localized heating of this heat responsive means and branch element and increases the temperature of the fluid which in turn increases the vapor pressure. This increased pressure is transmitted through the connecting means or conduit 22 into the rear end of the double acting cylinder 16 of the control 15. The interval of time for successively heating the branch element 11 and boiler 9, for example, is minimized or in the neighborhood of several minutes and this factor is a variable one depending on the design and construction of the components of the assembly.

The other heat responsive means or boiler 8 and branch element 10 thereof do not experience any localized heating because the image means 7 is not in a position to focus any reflected rays of the sun against this boiler and element and therefore their average temperature is less than that of the boiler 9 and its element 10 and since the vapor pressure is also appreciably less, a lesser pressure will be exerted against a front side of the piston 18, thereby creating an imbalance or unequal force on the piston. This operation is reversed in late afternoon when the image means 7 is successively focused against the other branch element 10 and boiler 8. The increased pressure obtained in the boiler 9 and its element, due to focused rays from the image means 7, creates an intense pressure against the piston 18 and causes its rod 14 to actuate the lever 12 and thereby impart movement to the assembly 1 about the pivot 4 to cause the image means to be automatically aimed, to follow the morning sun as it rises in the east as more or less evidenced in FIGS. 2 and 4.

When the assembly has moved to the correct operating position toward the sun the image means 7 will be located to obtain substantially its full benefit in focusing rays substantially against both of the heat responsive means or boilers 9 and 10 as best illustrated in FIG. 4 and as a consequence the localized temperatures of these boilers will increase, thereby resulting in an increase in the vapor pressures in the boilers and cylinder until an equilibrium condition is obtained in the system or systems thereby holding or locking the image means on focus. Any additional pressures will promote tracking stability by substantially firmly holding the image means 7 in its correct orientation, even under adverse windy conditions.

When the image means or device 7 can no longer focus increasing rays of sunlight at a focal image, area or location such as during nighttime or cloudiness, pressures in both boilers 8 and 9 reduce due to heat losses in the boilers and or systems and after an interval of time, all temperatures will be reduced to ambient and result in an equilibrium condition which results in causing the assembly 1 to return to a position in which the image means 7 faces a substantially south resting position 5 (in the northern hemisphere) as shown in FIGS. 1 and 4. When the sun rises, this assembly is capable of movement from this resting or neutral position through utilization of the focusing power of the image means against the branch element 11 and one or both of the heat responsive means 8 and 9 in response to all reasonable apparent positions of the sun, thereby assuring a recovery of tracking when the sun reappears. Since all of the vapor pressures existing in the system or systems are relatively low during non-sun conditions, there is a natural springiness or cushioning with respect to positioning the image means, since the system is shock resistant and this allows for a minimum of tolerance in movement resulting from any strong or gusty winds.

According to the inventor, the invention or inventions provide for "a double acting cylinder fitted with gas-tight seals which cause pivotation of the assembly and its associated image means about a selected axis. The two chambers of this double acting cylinder are individually connected by gas-tight lines to two discrete boiler assemblies which contain a volatile fluid. These two boiler assemblies are adjacent to one another at the focus of an image means when such means is aimed towards the sun. The result is that when such means is aimed correctly at the sun then the focal image of the sun from the image means impinges somewhat on each boiler, causing equal pressures to be developed in the two boiler systems, thereby maintaining the location of the piston in the double acting cylinder and therefore the orientation of the assembly. When the image means is aimed in some other direction then the sun's focal image impinges on one boiler to a greater extent than the other, it causes an increased vapor pressure in that boiler system, thereby causing an imbalance of pressures on the piston of the double acting cylinder, to operate the piston to pivot the assembly so as to correct its aiming."

DESCRIPTION OF SECOND MODIFICATION

Figure 5:
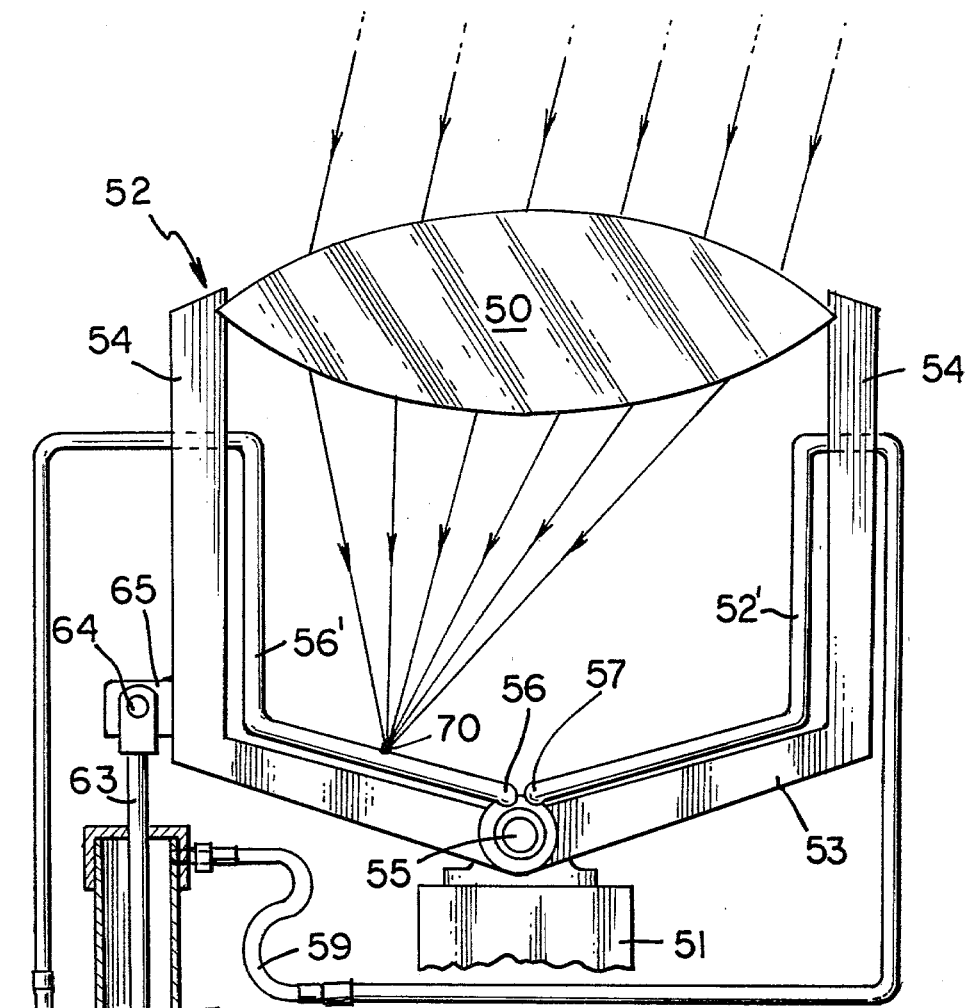
FIG. 5 is a schematic view of a second modification or embodiment of the invention.
Figure 6:
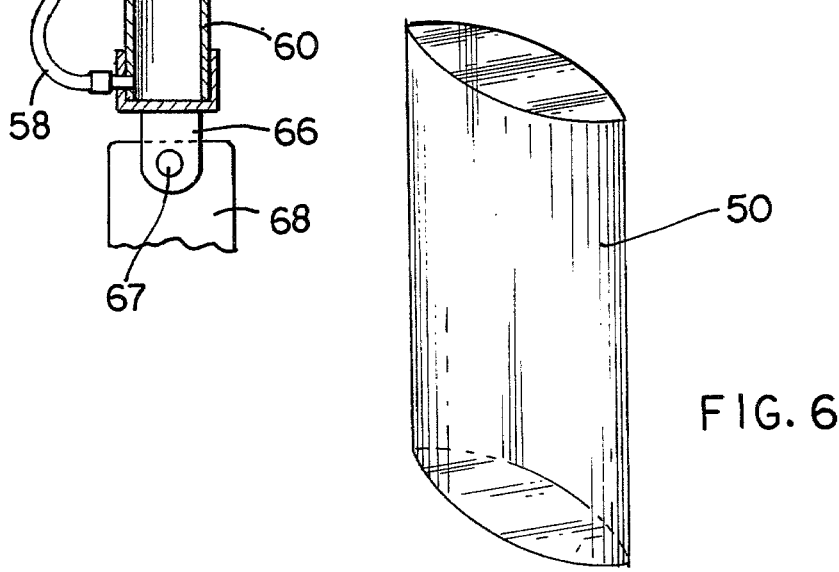
FIG. 6 is a perspective view of a lens shown in FIG. 5.

Referring to FIGS. 5 and 6 of the drawings there is disclosed a second modification or embodiment of the invention or inventions. This modification operates in a mode quite similar to the disclosures in FIGS. 1 through 4, except for the provision of an image means 50 which is of a refractory character, as distinguished from the curved reflector feature of the image means 7 alluded to above.

More particularly, the modification of FIGS. 5 and 6 includes a supporting structure 51, an assembly or support generally designated 52 having a frame formed by a V-shaped base 53 and parallel side members or supports 54. This frame and supporting structure are designed and constructed to provide a stable pivotal connection 55 therebetween so that motion can be imparted to the assembly relative to the supporting structure. The image means or lens 50 is preferably of a length or size to bridge or connect with the outer extremities of the member 54. More specifically, the longitudinal edges of the image means are anchored to the members or supports 54 to fixedly position the means 50 lengthwise or generally parallel to a longitudinal axis of the pivot connection 55.

The assembly 52 also includes a pair of heat responsive means or boilers 56 and 57 which respectively have angled or branch elements 56' and 57' which are located in the above mentioned frame and generally conform to its internal contour. These elements are spaced from the internal surfaces of the frame and extend outwardly from the frames 54 and connecting means 58 and 59, preferably in the form of fluid tight insulated conduits, respectively communicatively connect the heat responsive means or boilers to opposite ends of a cylinder 60 of a control generally designated 61. The connecting means are preferably detachably connectible with the boilers and cylinder by suitable couplings or fittings, as shown, in order to provide a fluid tight operating system or systems which will function efficiently when subjected to extreme pressures.

The control 61 includes the cylinder 60, a piston 62 having a rod 63 which is pivotally connected at 64 to a lever or projection 65 extending from the assembly and a rear end of the cylinder is provided with a fitting 66 which is pivotally connected at 67 to a fixed or stationary member 68, the arrangement being such that the control is operated by variable differential pressures obtained in the heat responsive means, connecting means and cylinder.

When the sun's rays, as indicated by the arrows, refract through the image means 50, these rays converge and focus against the element 56' of the heat responsive means or boiler 56 at point 70 as clearly illustrated in FIG. 5 to cause extreme heating of the fluid in this element and boiler and effect outward movement of the piston and rod, and thereby pivot the assembly 52 relative to its supporting structure 51 and thereby track the sun in a manner substantially corresponding to that described above with respect to FIGS. 1 through 4. Otherwise expressed, it should be manifest that in view of the operation of this second modification that its image means 50 will be caused to automatically focus the sun's rays against one or the other or both of the heat responsive means, depending on the position of the sun to equalize or imbalance the pressures to cause the control to actuate the assembly.

DESCRIPTION OF THIRD MODIFICATION

Figures 7, 8:
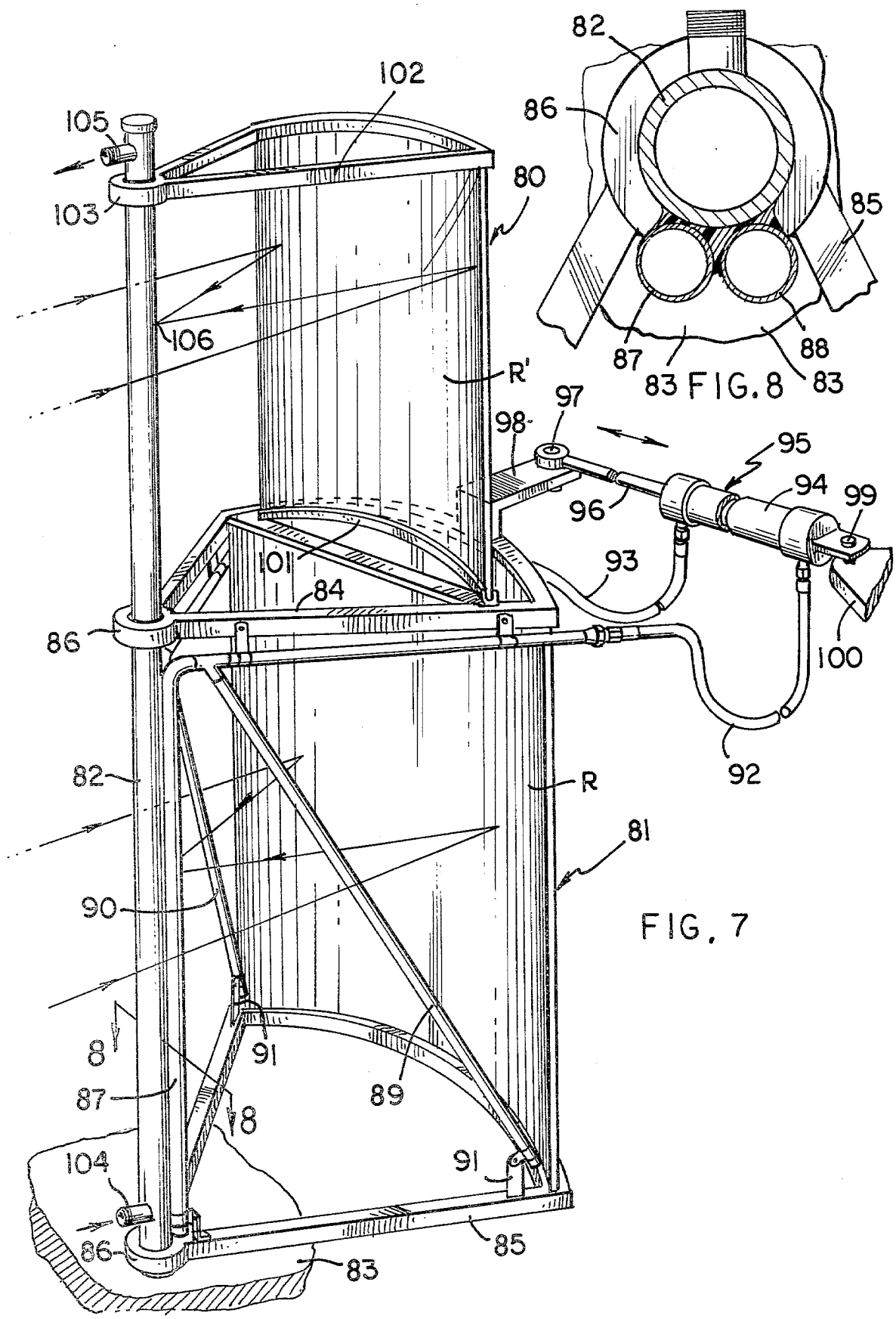
FIG. 7 is a pictorial view illustrating a third modification or embodiment of the invention.
FIG. 8 is an enlarged transverse sectional view taken substantially on line 8—8 of FIG. 7.

A third modification or embodiment of the invention or inventions is illustrated in FIGS. 7 and 8. The equipment shown may be designed and constructed in various ways and utilized wherever desired, such as for possible application in a residential solar steam driven generator, and as shown includes a pair of assemblies generally designated 80 and 81, with the assembly 80 being super-imposed on the assembly 81 and so that both will pivot in unison with respect to a longitudinal axis of a hollow or tubular support, standard or pillar which constitutes a heat responsive means or boiler 82 which is fixedly secured to a supporting structure 83. It is preferable that the longitudinal axis of the tubular support substantially point toward the North Star.

The lower assembly 81 preferably includes upper and lower generally triangular frames 84 and 85 which have corner enlargements 86 provided with apertures or openings through which the standard or boiler 82 extends in order to obtain pivotal connections with the latter. The assembly 81 also includes an image means R, a pair of upstanding heat responsive means or boilers 87 and 88, as best shown in FIG. 8, which are arranged in relatively close upstanding juxtaposed positions in relation to the boiler 82, with their lower ends being mounted on the lower frame 85. The boilers 87 and 88 respectively include angularly disposed branch elements 89 and 91 which have upper ends respectively joined to extensions of the boilers and lower ends which are connected by fasteners 91 to the outer corners of the lower frame 85. These elements also serve as braces and thereby impart stability to the assembly. Connecting means, preferably in the form of flexible conduits 92 and 93 respectively communicatively connect the boilers and their branch elements to the opposite ends of a cylinder 94 of a control generally designated 95. A piston (not shown) is disposed in the cylinder and a piston rod 96 is pivotedly connected at 97 to a lever 98 extending from the upper frame 84 of the lower assembly 81. The cylinder 94 has a rear end pivoted at 99 to a fixed mounting 100. The boilers and branch elements thereof, including the cylinder and connecting means are adapted to contain a volatile fluid for the same purpose as described above with respect to the equipment shown in FIGS. 1 through 6.

The image means R is preferably in the form of a parabolic cylinder and its upper and lower extremities are secured to opposed portions of the upper and lower frames 84 and 85 so that its concave or curved reflecting surface generally faces the boiler 82.

The upper assembly 80 includes a lower curved support 101 and an upper generally triangular frame 102 having a corner enlargement 103, similar to the enlargements 86, and has an aperture through which the boiler 82 extends for holding the upper frame in pivotal relation thereto. The lower support 101 is fixedly mounted on the frame 84 for movement therewith, including the lower assembly 81. An image means R' preferably in the form of a parabolic cylinder has its upper and lower extremities respectively secured to an outer curved portion of the upper frame 102 and to the curved lower support 101 so as to position the means R', constituting a reflector, in a facing relation to the boiler.

The boiler or standard 82, as alluded to above, is tubular or hollow and in addition to serving as a support is adapted to serve as a reservoir for a fluid, such as water, which can enter through a lower inlet 104 for regulated flow upwardly through the boiler and out an exit 105 for transmitting hot water, for example, in a residential dwelling.

In view of the equipment illustrated in FIGS. 1 through 5 and their described operations it should be readily manifest that the equipment of FIGS. 7 and 8 operates or functions in a generally similar mode. More particularly, in this regard, the sun's rays as indicated by the arrows will engage the image means R and then reflect back and focus on one or the other or both of the heat responsive means 87 and 88 to heat the fluids therein, depending on the positions of the assemblies 80 and 81 with respect to the sun, for operating the control 95 for automatically pivoting the assemblies toward the sun to obtain the maximum benefit therefrom. When the sun is low in the morning the focal point of the sun's rays from the image means R will be somewhere along the length of one of the branch elements of a heat responsive means and when the focal point is between and against the boilers 87 and 88 the fluids therein will heat and exert pressures against the piston to obtain an equilibrium which will hold the image means directly facing the sun. The piston rod 96 and piston operated by the different pressures in the cylinder and system or systems causes the lever 98 carried by the assembly 81 to pivot the latter and the upper assembly 80 as a unit since these two assemblies are connected together. Each of the boilers and its branch element and conduit extending therefrom constitutes a separate fluid operable system which is connected to the control 95 which is common to and responsive to both of these systems.

The upper assembly 80 moves in unison with the lower assembly 81 and its image means R' receives rays from the sun for reflection and focus against the boiler 82 as indicated at 106 to heat, for example, water in the boiler for eventual use, such as for a supply of hot water or steam for personal use or for space heating. It is to be understood, of course, that the image means R focuses the reflected rays of the sun at different locations along the lengths of either or both of the branch elements in response to the moving positions of the sun and the reflected rays from the image means R' will be focused for line engagement throughout substantially the full length of the upper extremity or that portion of the boiler 82 which is located opposite the image means R'.

The disclosures in FIGS. 6 and 7, should be sufficient to justify an acknowledgement that, if so desired, one or more assemblies in addition to 80 and 81 can be added or mounted in relation thereto for operation in conjunction therewith.

DESCRIPTION OF FOURTH MODIFICATION

The invention or inventions further contemplate the use of a fourth modification or embodiment as illustrated in FIGS. 9, 10 and 11 of the drawings. This fourth modification, among other things, preferably involves providing equipment for heating or influencing the operation or use of some entity or receiving means located an appreciable distance or at a remote location from an image means.

More particularly, the equipment includes an assembly generally designated 151 which is stationarily mounted on a supporting structure generally designated 152. The assembly preferably includes a framework or mountings 153 which respectively carry an upper substantially image means 154 which is slightly concave and a lower curved image means 155, the latter of which is somewhat smaller than the means 154. The equipment is obviously arranged in a direction facing a south position S and is preferably designed and constructed so that the upper image means 154 will receive the sun's rays as indicated by the arrows for reflection against a receiving means 156 which is preferably mounted at the upper extremity of a tower or pylon 157 located any desired distance from the image means such as for example, a distance of one thousand feet (1,000'). The receiving means may be in the form of a heat responsive means such as a boiler, or may be designed to operate some other entity, such as a control for operating some contrivance.

The assembly 151 includes a framework, as alluded to above, supporting the image means 154 and 155 and includes a pivotal rod or support 158 having a lower end pivotally connected to the base of the structure 152 so that these image means will pivot in unison. As best shown in FIG. 10, the framework or mountings 153 are provided with a lever 159 and a piston rod 160 of a control 161 is pivotally connected to the lever 159 and one end of a cylinder of this control is pivotally connected at 162 to a fixed fitting 163 on the structure 152, the arrangement being such that movement of the piston rod by a piston in the cylinder will cause pivoting of both image means in unison about the axis of the pivot rod 158.

The image means 155 is preferably in the form of a parabolic cylinder and rays from the sun 2 in the morning or A.M. position will engage the means 155 and focus the reflected rays against a heat responsive means generally designated 164 which is fixedly mounted on an upright 165 of the structure 152 in a position opposite from the means 155. The responsive means 164 includes a pair of closely associated boilers 166 and 167 and tubular branch elements 168 and 169. These boilers as shown in FIG. 10 are located between and generally in alignment with the pivotal axis of the rod 158 and the receiving means 156 on the tower 157. During movement of the sun in the morning the image means 155 will receive and focus the rays against the branch element 168 and when the sun reaches a position so that the image means 155 focuses the reflected rays against both of the boilers 166 and 167 this will cause differential pressures in the control 161 and thereby cause both image means to move in unison so that the upper image means 154 will reflect incoming rays against the receiving means 156 carried by the tower 157 and continue to do so until real late in the afternoon when the rays will leave both of the boilers and then engage the other branch element 169. The branch element 168 extending from the heat responsive means or boiler 166 is communicatively connected to a fore end of the control 161 by a flexible conduit or line 170 and the branch element 169 extending from the heat responsive means or boiler 167 is communicatively connected to a rear end of the control by a flexible conduit 171. A sufficient supply of a volatile fluid is utilized in the system or systems so that when heated it will vaporize and create equal or differential pressures against the piston which causes the control to pivot the assembly. More specifically in this regard, and for example, when the branch element 168 is first heated sufficiently by the morning sun pressure will be produced in this element, boiler 166 and line 170 to cause some retraction of the piston and its rod 160 and thereby cause some clockwise pivotation of the image means 155 until it is focused on both boilers which substantially creates corresponding or differential pressures against the piston and causes this image means and the image means 154 to follow the path of the sun.

The period of time required to heat, for example, the branch element 168 produces a pressure sufficient to effect movement of the assembly to cause the image means 155 to focus its rays against both boilers can be achieved within several minutes. Otherwise expressed, only a minimum amount of time is required to cause substantially an equalization of the differential pressures in the system or systems in a manner whereby the control will correctly automatically move the assembly so that the image means will follow the sun. This factor of substantial equalization will vary to some extent because movement of the sun, at times, will cause the focused rays to heat one of the boilers more than the other and thereby effect movement of the assembly through the agency of the control in response to the pressures in the latter.

In view of the foregoing, it is to be understood that the use of the term "image means" is intended to include various forms of mirrors, such as those which are curved, parabolic, spherical, cylindrical parabolic, cylindrical circular, including various forms of lenses such as those which are generally referred to as fresnel, convex and double convex. It is also to be understood that the term "heat responsive means" employed in certain of the claims is intended to be utilized in a generic sense to include a boiler or any other means which is suitable for heating and conductive purposes and that the use of the word "control" is intended to include a double actable fluid operable device or any other device which is responsive to differential fluid pressures or conditions for controlling the pivotal movement of at least certain of the assemblies which carry an image means. Otherwise expressed, a device other than a double acting cylinder may be utilized which will convert differential pressures into a motion about a desired axis. It is to be further understood that the system or systems when actively utilized will afford a return flow of the volatile fluid to a lower level or levels when the fluid cools and reduces the pressures.

The invention or inventions also contemplate the use of multiple assemblies which can be pivoted relative to different axes.

Having thus described my invention or inventions, it is obvious that various modifications or additions to those described may be made in the same without departing from the spirit of the invention and, therefore, I do not wish to be understood as limiting myself to the exact forms, constructions, arrangements, and combinations of the components herein shown and described.

I claim:

1. An assembly supported for movement in order to accurately direct a solar collector to follow the motion of the sun, comprising a pair of heat responsive boiler means, a pair of heat responsive branch elements extending in an outward direction in relation to said heat responsive boiler means and operatively associated therewith, image means for focusing the rays of the sun simultaneously against both of said heat responsive boiler means for heating the latter when the assembly is correctly aimed at the sun, and control means responsive to any differentials in the heated conditions of said heat responsive boiler means whereby to impart motion to the assembly to cause said image means to follow the sun and thereby substantially continuously focus its rays simultaneously against both of said heat responsive boiler means.

2. The assembly defined in claim 1, in which said heat responsive boiler means are in the form of boilers containing a volatile fluid which when heated creates pressures in the boilers, and said control means responds to the difference in such pressures for imparting motion to said assembly.

3. Means to cause an assembly to accurately direct a solar collector to follow the motion of the sun, said means comprising an assembly provided with means facilitating its connection with a supporting structure for movement about a central axis, said assembly also being provided with a pair of arms and a pair of boilers, a pair of tubular branch elements respectively communicatively connected to said boilers and extending in an outward direction in relation thereto, a control, a pair of conduits respectively communicatively connecting said branch elements and said control, said boilers, branch elements, conduits and control being adapted to contain a volatile fluid, and image means carried by said arms for focusing the sun's rays against one or the other of said branch elements or one or the other or both of said boilers for heating such a fluid and so that both of said boilers are heated when the assembly is correctly aimed at the sun to create pressures for reaction by said control, said control including means to effect movement of the assembly relative to said axis due to the differential of the pressures in said boilers so the image means will substantially automatically face the sun during its movement in the sky.

4. The means defined in claim 3, in which at least portions of said branch elements are disposed in lateral angles with respect to said boilers.

5. The means defined in claim 3, in which said boilers are disposed in a juxtaposed relationship in close proximity to said axis.

6. The means defined in claim 3, in which said branch elements are disposed in lateral angles with respect to said boilers, and said control is of a double acting piston character.

7. The means defined in claim 3, including a supporting structure provided with means connected to said facilitating means on said assembly to establish a pivotal movement of said assembly about said axis, and said control comprises an elongated cylinder having a reciprocable piston therein and a piston rod which is pivotally connected to the assembly and an end of the cylinder is pivotally connected to a stationary mounting.

8. A method of tracking the sun which comprises providing an assembly for pivotal movement with respect to a supporting structure, providing the assembly with a pair of individual heat responsive means for containing a volatile fluid, with branch elements extending in a direction generally outward therefrom and with an image means for focusing the rays of the sun against one or the other or both of said heat responsive means to heat the fluid therein such that both are heated when the assembly is correctly aimed at the sun and thereby obtain pressures in these heat responsive means, and then utilizing the difference in these pressures to pivot the assembly relative to the supporting structure whereby the image means will be caused to substantially automatically follow the sun's movement in the sky.

9. Means for tracking the sun by utilizing its energy comprising a supporting structure, an assembly mounted on said structure for movement with respect thereto, said assembly including an upper image means having a reflecting surface and a lower image means having a curved reflecting surface, a pair of heat responsive means arranged so that both are heated when the assembly is correctly aimed at the sun and being respectively provided with tubular branch elements disposed in a divergent relation with respect to said heat responsive means, a control, a pair of flexible conduits respectively communicatively connecting said branch elements to said control whereby each heat responsive means and its branch element and a flexible conduit constitutes a separate system for containing a volatile fluid which when heated by focused rays from said lower image means against said pair of heat responsive means or one or the other of their branches will create differential pressures in the systems to operate the control, said control including means causing movement of the assembly so that both image means will automatically follow the path of the sun.

10. The tracking means defined in claim 9, including a receiving means which is located a remote distance from said upper image means and responsive for operation by the sun's rays reflected from this image means.

11. A subassembly comprising an elongated tubular support provided with an inlet and an outlet so that a fluid can readily flow therethrough, a framework mounted on said support for pivotal movement about its longitudinal axis and provided with a pair of elongated heat responsive means which extend lengthwise in close juxtaposed relation to said support, with branch elements extending in a generally outward direction with respect to said elongated heat responsive means and with curved image means facing said heat responsive means for receiving the sun's rays for focusing the latter against said heat responsive means such that both are heated when the assembly is correctly aimed at the sun for heating a fluid therein to create pressures, a control responsive to the difference in these pressures connected to said framework for pivoting the latter, and another image means carried by said framework for focusing these rays against at least a portion of said support for heating a fluid for flow therethrough.

12. Means for tracking the sun comprising a supporting structure, an assembly mounted on said structure for movement with respect thereto and being provided with an upper image means and a lower image means which are acted upon by the sun's rays, a pair of boilers having tubular branches disposed in a stationary position substantially in front of said lower image means for containing a volatile fluid, said branch elements disposed in a divergent direction in relation to said boilers, a control operable by fluid pressures, a pair of means respectively communicatively connecting said pair of boilers with said control whereby said lower image means serves to focus the sun's rays against said boilers for heating the latter such that both boilers are heated when the assembly is correctly aimed at the sun and a fluid when contained therein to produce differential pressures therein, means for transmitting said differential pressures to said control to cause the latter to move the assembly and the upper image means carried thereby so the latter will receive and aim the sun's rays in a predetermined direction for operating a receiving means located a remote distance therefrom.

13. The tracking means defined in claim 12, in which the lower image means also serves to focus the sun's rays against said tubular branches when the rays are not focused directly against the boilers.

14. Means for tracking the sun by utilizing its energy comprising a supporting structure, an assembly mounted on said structure for movement about an axis which is substantially central to said structure and assembly, said assembly including a pair of heat responsive means respectively provided with tubular branch elements, and a lens spaced therefrom, a control, a pair of flexible conduits respectively communicatively connecting said branch elements to said control whereby each responsive means and its branch element and a flexible conduit constitutes a separate system for containing a volatile fluid which when heated by focused rays from said lens against said pair of heat responsive means such that both are heated when the assembly is correctly aimed at the sun or one or the other of their branches will create pressures in the systems to operate the control whereby the latter will cause movement of the assembly so that said lens will automatically follow the path of the sun.

15. Means for tracking the sun comprising a supporting structure, an assembly mounted on said structure for movement with respect thereto and being provided with a pair of image means which are acted upon by the sun's rays, a pair of heat responsive boiler means disposed in a position substantially in front of at least one of said image means and having branch elements mounted in a generally diverging position with respect thereto, whereby both of said heat responsive boiler means are heated when the assembly is correctly aimed at the sun and whereby at least one of said branch elements is heated when the assembly is incorrectly aimed at the sun, control means responsive to any differentials in the heated conditions of said heat responsive boiler means, a pair of means respectively communicatively connecting said pair of heat responsive boiler means with said control means whereby one of said image means serves to focus the sun's rays against said heat responsive boiler means for heating the latter such that said control means will move the assembly to a point where the other image means carried thereby will receive and aim the sun's rays at a receiving means located at a remote distance therefrom.

16. Means for tracking the sun comprising a supporting structure, an assembly mounted on said structure for movement with respect thereto and being provided with a pair of image means which are acted upon by the sun's rays, a pair of heat responsive boiler means disposed in a position substantially in front of at least one of said image means such that both of said heat responsive boiler means are heated when the assembly is correctly aimed at the sun, heat responsive branch elements extending in a divergent direction in relation to said heat responsive boiler means, a control responsive to said heat responsive boiler means and branch elements, a pair of means respectively communicatively connecting said pair of heat responsive boiler means and said branch elements with said control whereby one of said image means serves to focus the sun's rays against said heat responsive boiler means for heating the latter to differential conditions, means for transmitting said differential conditions to said control in a manner whereby the latter will move the assembly so the other image means carried thereby will receive and aim the sun's rays in a predetermined direction for operating a receiving means located a remote distance therefrom.

* * * * *